Dec. 29, 1925.

W. SHERWOOD 1,567,198

WATER INLET VALVE FOR TANKS

Filed Oct. 15, 1923

William Sherwood, Inventor

By J. E. Thomas, Attorney

Patented Dec. 29, 1925.

1,567,198

UNITED STATES PATENT OFFICE.

WILLIAM SHERWOOD, OF DETROIT, MICHIGAN, ASSIGNOR TO SHERWOOD BRASS WORKS, OF DETROIT, MICHIGAN, A CORPORATION OF MICHIGAN.

WATER-INLET VALVE FOR TANKS.

Application filed October 15, 1923. Serial No. 668,515.

*To all whom it may concern:*

Be it known that I, WILLIAM SHERWOOD, citizen of the United States, residing at Detroit, county of Wayne, State of Michigan, have invented a certain new and useful Improvement in Water-Inlet Valves for Tanks, and declare the following to be a full, clear, and exact description of the same, such as will enable others skilled in the art to which it pertains to make and use the same, reference being had to the accompanying drawings, which form a part of this specification.

My invention relates to an improvement in water inlet valves for tanks shown in the accompanying drawings and more particularly described in the following specification and claim.

This invention is designed as an improvement upon the device described and claimed in Letters Patent No. 1,389,907, issued to me September 6th, 1921.

It has been found in practise that the movable valve closure—shown in the patent referred to—has a tendency to rub or bind against the wall of the valve casing, when seated by the float lever actuated through the altitude of the water in the tank. In the patent referred to it will be noted that the hook shaped fitting carried on the end of the float lever oscillates upon trunnions integral with the valve body or chamber and is connected with the closure or plunger by a transverse pin extending through slots in the fitting and through an aperture in the plunger. The hook-shaped slots of the fitting extend on a horizontal plane with the axis of the trunnions and pin engaging the plunger to the fitting when the plunger is seated. It has been found however that in seating the valve through the operation of the float, the tendency is to force the closure plunger laterally against the wall of the valve chamber opposite the trunnions on which the fitting rocks. This action causes frictional contact between the plunger and the valve casing and militates against the ready and proper seating of the valve:—the object therefore of the present invention is to overcome this objectionable feature in the construction of the device shown in the prior patent.

In carrying this object into effect the hook-shaped slot of the fitting is extended at an angle to a line drawn horizontally through the axis of the trunnions and the transverse pin connecting the fitting with the valve closure or plunger when the latter is seated. By so constructing the hook-shaped slot of the fitting the valve is guided thereby to its seat without lateral movement to cause it to impinge upon the wall of the valve casing.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Referring now to the letters of reference placed upon the drawings:

A, indicates a flushing tank.

B, denotes a discharge valve of ordinary construction its operating mechanism being eliminated as the latter forms no part of this invention.

C, designates the usual overflow pipe. D, indicates a pipe extending upwardly from the bottom of the tank, on which is mounted a water-inlet valve chamber E.

F, denotes the valve seat, which in the present embodiment is an integral part of a fitting screwed into the valve chamber E, and upon the upper end of the inlet pipe D.

G, indicates a divided reciprocating valve plunger, to the lower end of which is screwed a ring H, counterbored to support a valve disk or washer I.

J, designates a leather cup interposed between the upper and lower portion of the plunger,—the divided plunger being connected together as a single unit by a screw stem $G^1$, which projects upwardly from the lower portion of the plunger through the leather cup, into the upper portion of the plunger.

K, denotes a ball float mounted on a rod L, in turn supported by a hook-shaped bifurcated fitting M, oscillating upon trunnions $E^1$, integral with the valve body or chamber.

N, designates a transverse pin connecting the valve plunger G with the fitting M,—extending through a slot $E^2$ in the valve body adjacent to the trunnions. A slot $M^1$ forming the hook of the bifurcated fitting M is inclined upwardly at an angle to the plane of a line drawn through the axis of the pin N and the trunnions $E^1$, when the valve plunger is seated by the operation of the float lever upon the water in the tank reaching a predetermined altitude.

It will be seen that the hook-shaped bifurcated fitting of the present invention differentiates from the hook-shaped bifurcated fitting shown in the prior patent in the angle given to the slot forming its hook-shaped portion,—it having been found as previously indicated, that the operation of the device when constructed as shown in the patent had a tendency to force the valve plunger against the wall of the valve casing causing a frictional resistance or drag that prevented the proper seating of the valve. The construction of the hook-shaped fitting in the present device has overcome this objectionable feature, the plunger being guided to its seat by the operation of the float lever without frictional contact with the outer valve casing.

P, indicates an adjustable screw extending through the fitting M, adapted to bear against the wall of the valve chamber to limit the rocking movement of the fitting.

Q, denotes a water discharge pipe leading downwardly from an opening in the valve chamber.

R, designates a pipe extending from the valve body to the overflow pipe for supplying the "after-fill".

Having thus described the several parts by reference letters the construction and operation of the device will be readily understood.

Figure 1:
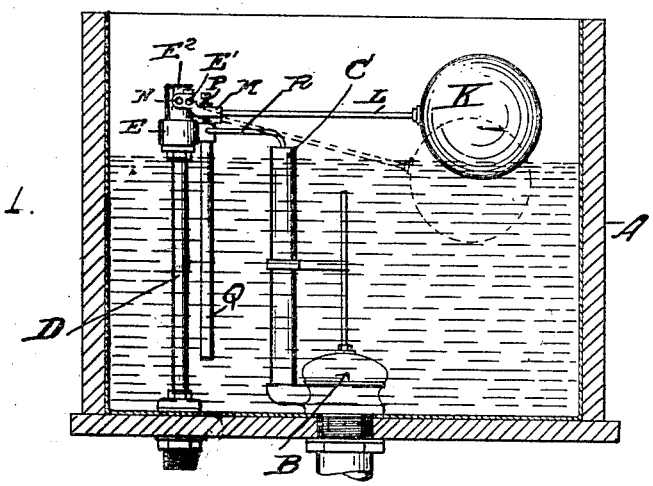
Figure 1 is a longitudinal vertical sectional view through a flushing tank showing the inlet valve and controlling mechanism in elevation as they would appear when the water has reached its maximum altitude,— and in dotted lines the position of the float when the water is discharged from the tank.
Figures 2, 3, 4:
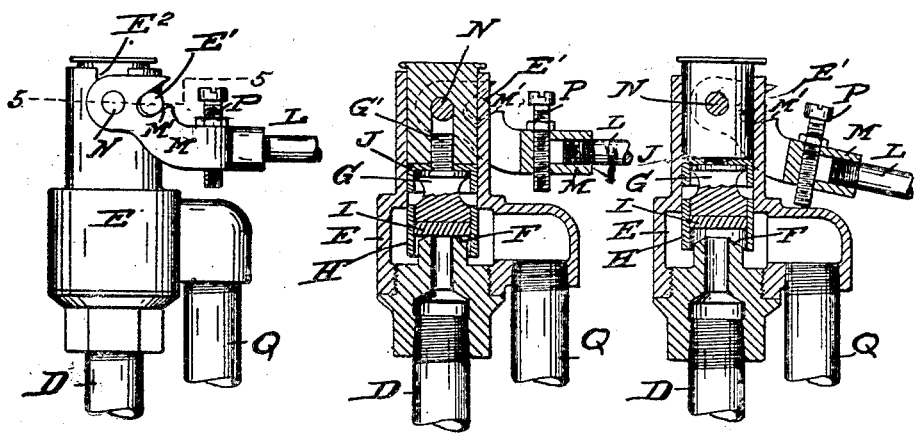
Figure 2 is a side elevation of the valve and fitting, secured to the float rod, for actuating the closure plunger, on a relatively enlarged scale.
Figure 3 is a vertical cross-sectional view of the inlet valve in the position occupied when "closed."
Figure 4 is a similar vertical cross-sectional view with the valve "open" to admit water into the tank.
Figure 5:
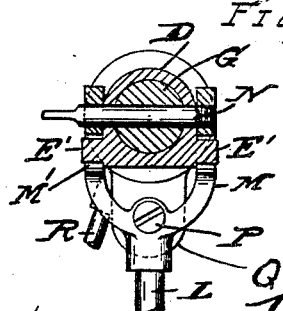
Figure 5 is a horizontal cross-sectional view taken on or about line 5—5 of Figure 2.

When the water has been discharged from the tank by lifting the valve B from its seat in the usual manner, the float K will be in the position indicated by the dotted lines in Figure 1 and the inlet valve in the position shown in Figure 4, thereby permitting the water to pass through the pipe D, out through the pipe Q into the tank.

Upon the water in the tank reaching a sufficient altitude to raise the float to the position indicated in Figures 1, 2, and 3, the valve will be forced to its seat against the pressure of the incoming water: the degree to which the valve may be opened is regulated within certain limits by the screw P.

It will be noted that by forming the slot $M^1$ in the bifurcated fitting M at an angle to a horizontal line drawn through the axis of the pin N and trunnions $E^1$ when the valve is seated, the valve may be guided to its seat through the operation of the float lever without any tendency to force the valve plunger laterally against the wall of the valve chamber,—resulting as before explained in the valve being forced into frictional contact with the valve body, thereby preventing it from seating.

Having thus described my invention what I claim is:

In a device of the character described, a water inlet pipe for a flushing tank, a valve casing located on the upper end of said pipe and having a valve chamber adapted to communicate with the tank and having laterally projecting trunnions a valve seat in said chamber, a plunger valve adapted to seat against the flow of water into the tank, a float rod, a float carried by the rod, a bifurcated fitting secured to the float rod and having its leg portions embracing the valve casing and provided with slots to receive said trunnions, and a transverse pin connecting the bifurcated fitting with said plunger and disposed normally in substantially a horizontal plane with said trunnions and relatively close thereto, said slots in the leg portions being inclined upwardly at an angle to a horizontal plane through the axis of said pin when the valve plunger is seated whereby the bifurcated fitting is prevented from rocking laterally upon said trunnions and whereby the float is maintained against lateral movement to prevent the float from rubbing against the inner faces of the front and back walls of the tank and thereby insuring a positive vertical movement of the plunger within the casing to prevent binding of the valve in its movement within the casing.

In testimony whereof, I sign this specification.

WILLIAM SHERWOOD.